Patented June 30, 1931

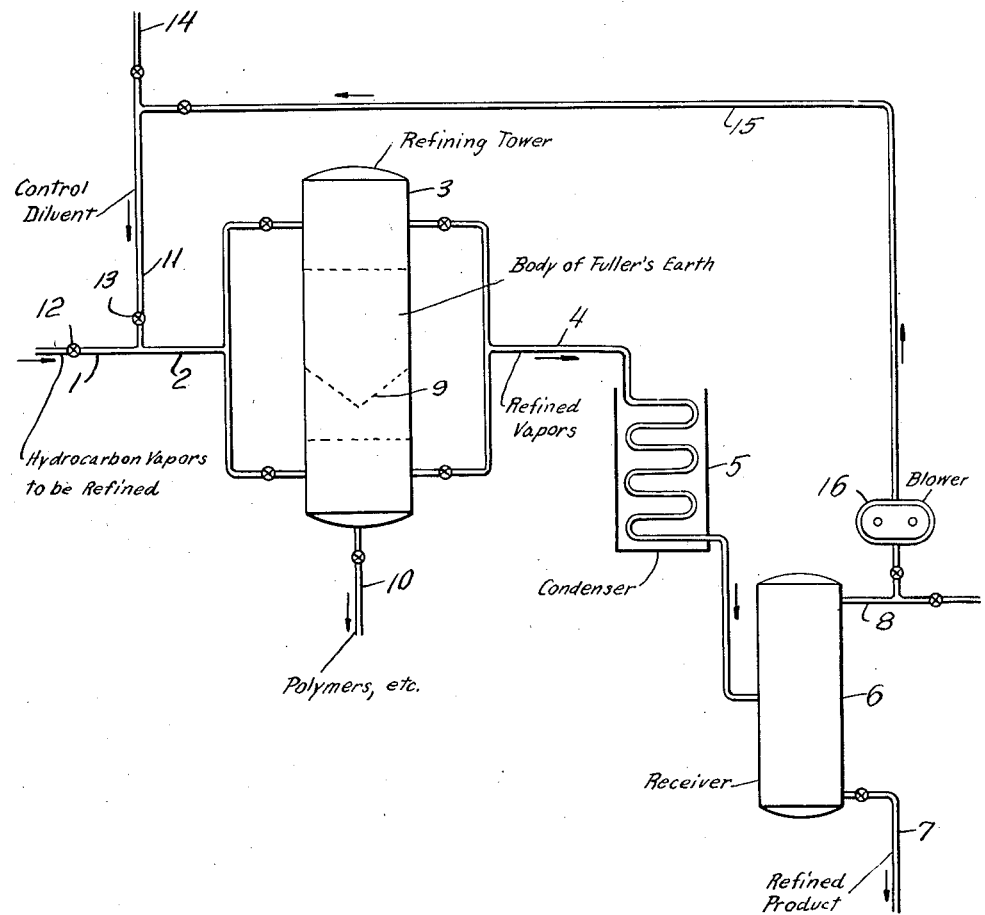

1,812,426

UNITED STATES PATENT OFFICE

FRANK A. APGAR, OF EAST CHICAGO, INDIANA, ASSIGNOR TO SINCLAIR REFINING COMPANY, OF NEW YORK, N. Y., A CORPORATION OF MAINE

ART OF REFINING HYDROCARBONS

Application filed February 29, 1928. Serial No. 258,098.

This invention relates to improvements in the vapor phase refining of hydrocarbons and hydrocarbon mixtures; and more particularly relates to improvements in refining operations in which hydrocarbon vapors are passed in contact with an adsorptive catalyst such as fuller's earth to separate, by adsorption or polymerization or otherwise, constituents not suitable as components of the refined product.

When hydrocarbon vapors including certain types of unsaturated compounds, for example the di-olefines, are passed in contact with fuller's earth or similar adsorptive catalysts, a polymerization of these unsaturated compounds takes place with resulting formation of polymers of boiling point higher than that of the original compound. This makes possible a separation of such constituents, undesirable as components of the refined product without separation of other unsaturated constituents suitable as components of such products, and the several advantages of this general method of refining hydrocarbon vapors have made it of considerable practical importance, in the refining of motor fuel gasoline in particular. As applied to gasoline, this general method makes possible the removal of constituents rendering the product unstable, of bad color or bad odor without removal of unsaturated constituents of special value in the product, such as those which have anti-knock properties.

As commonly practiced, this general method has involved charging of a suitable receptacle with a batch of the adsorptive catalyst, passing the hydrocarbon vapors through this repectacle in contact with the adsorptive catalyst until the catalyst has lost its effectiveness, discharging the spent adsorptive catalyst, replacing the discharged material with a fresh charge of the adsorptive catalyst, and so on. The adsorptive catalyst as initially supplied to the operation, however, is highly active, much more active than it is during the major part of the operation. This high initial activity and the subsequent decrease in activity of the adsorptive catalyst involves several difficulties. In particular, it makes it difficult to avoid over-treatment of the hydrocarbon vapors passed in contact with the adsorptive catalyst when fresh, with consequent losses it makes it difficult to maintain uniform operating conditions and it makes it difficult to secure a uniform product.

The initial activity of the adsorptive catalyst induces over-treatment in at least two ways. The initial activity itself tends to cause over-treatment. In addition, the polymerization action is exothermic and as a consequence the tendency toward increase in the reaction rate involves a tendency toward temperature increase. This in turn tends to increase the rate at which the reaction proceeds. This tendency toward over-treatment has peculiar disadvantages in the treatment of motor fuel gasoline.

In the treatment of hydrocarbon vapors including gasoline components produced by vapor phase cracking, for example, the temperature increase on passage through a body of fresh fuller's earth may amount to as much as 100° F. or more, and this increase in temperature is usually accompanied by an increase in the color of the hydrocarbon vapors escaping from the fuller's earth treatment. In the case of hydrocarbon vapor mixtures which have been fractionated to some definite end boiling point, this end boiling point is usually substantially elevated. Apparently, these undesirable effects upon the character of the escaping product are due to vaporization of polymers formed by the action of fuller's earth with consequent contamination of the escaping vapor mixture. Further over-treatment tends to cause losses in the separation and removal of constituents suitable and desirable as components of the motor fuel product.

This invention provides an improved method of operation which reduces to a minimum difficulties due to variations in the activity of the adsorptive catalysts used in this type of refining operation. The advantages of the invention include improvement in uniformity of operation, improvement in uniformity of product, and improved economy with respect to the adsorptive catalyst used.

According to the present invention, the refining operation is controlled by diluting the hydrocarbon vapors passing in contact with the adsorptive catalyst with an inert or relatively inert fluid and regulating the ratio between the hydrocarbon vapors and the controlling diluent in the mixture passing through the adsorptive catalyst, by regulating the rate at which the controlling diluent is supplied, to decrease or increase, respectively, the proportion of hydrocarbon vapors to be refined in the mixture passing through the adsorptive catalyst to correspond to increase or decrease in the activity of the adsorptive catalyst as the refining operation proceeds. The controlling diluents suitable for use in carrying out the invention include steam, hydrocarbon gas mixtures such as those escaping uncondensed from condensing operations for the recovery of a condensate product, saturated hydrocarbon gases, and the like. Steam is a particularly advantageous controlling diluent. Likewise, light oil fractions which when vaporized are relatively inert with respect to the refining operation may be so introduced into the hydrocarbon vapors supplied to the refining operation.

The addition of a controlling diluent to the hydrocarbon vapors supplied to the refining operation, in accordance with this invention, has a dual function in accomplishing the improved results obtained. Assuming a fixed throughput of the hydrocarbon vapors is to be refined, the addition of a diluent increases the rate of flow through the adsorptive catalyst thus decreasing the time of contact between the hydrocarbon vapors to be refined and the adsorptive catalyst. The diluent itself also makes it possible to control the progress of the reactions involved in the refining operation and the added diluent assists in dissipating heat formed in the refining operation, in this last respect the diluent also serving as a temperature controlling medium. In carrying out this invention, the control secured by regulation of the degree of dilution thus includes control of the temperature of the operation as well as direct control of the operation itself.

In carrying out the present invention a maximum ratio between the controlling diluent and the hydrocarbon vapors in the mixture passing through the adsorptive catalyst is maintained while the adsorptive catalyst is fresh and highly active and this ratio is progressively decreased as the activity of the adsorptive catalyst decreases. Over-treatment of the hydrocarbon vapors and consequent losses are thus avoided. The operation itself is made more uniform and a more uniform product, as to color for example, is secured. The polymerization reactions involved in the refining operation may be more closely controlled to limit or eliminate the separation of constituents suitable as components of the desired product. Over-treatment of the hydrocarbon vapors passing through the adsorptive catalyst also tends to involve excessive consumption of the catalyst, and this tendency also is minimized. The use of steam as a controlling diluent seems to be particularly advantageous in improving the life of the adsorptive catalyst.

The invention will be further described in connection with the accompanying drawings which illustrate, diagrammatically and conventionally, in elevation, apparatus adapted for carrying out the invention, but it is intended and will be understood that this more detailed description and illustration of the invention is by way of exemplification.

Referring to the drawings, the hydrocarbon vapors to be refined are supplied through connections 1 and 2, either to the upper end or to the lower end of the tower 3, are passed through a charge of the adsorptive catalyst in this tower and are discharged from the opposite end of the tower through connection 4 to a condenser 5. Condenser 5 discharges into a receiver 6 from which the condensed refined product is discharged through connection 7 and uncondensed vapors and gases through connection 8. The charge of the adsorptive catalyst is supported upon a foraminous partition 9 adapted to retain the catalyst but to permit free passage of vapors. Fuller's earth of 40–60 or 60–80 mesh may be used as the adsorptive catalyst. Other adsorptive catalysts useful in carrying out the invention include activated carbon, silica gel, metallic gels and the like. The hydrocarbon vapors to be refined may be passed either upwardly or downwardly through the charge of the adsorptive catalyst, the valved branch connections illustrated between the tower and connections 2 and 4 being provided to permit operation in either manner. Polymers or other liquefied portions of the hydrocarbon vapors supplied to the operation are discharged from the lower end of the tower through connection 10. The discharge of this liquefied condensate may be regulated, for example, to maintain a definite liquid level in the lower end of the tower.

The operation so far as described in the preceding paragraph is the usual operation, the charge of the adsorptive catalyst in the tower 3 being replaced with a fresh charge as the preceding charge becomes exhausted. Ordinarily, the hydrocarbon vapors subjected to the refining treatment are as a consequence passed in contact with an initially fresh and highly active body of the adsorptive catalyst, this activity decreasing as the operation proceeds, as each charge of the adsorptive catalyst is replaced with a fresh charge. According to the present invention, however, this variation in the activity of the adsorptive catalyst is compensated for by the addition of a controlling diluent, the addition of the diluent being regulated as the operation proceeds so that the proportion of the diluent present and therefore its effect in counteracting the activity of the adsorptive catalyst is decreased as the activity of the adsorptive catalyst decreases.

In carrying out the invention in the apparatus illustrated, this controlling diluent is supplied through connection 11, being mixed with the hydrocarbon vapors to be refined as they flow through connection 2 to the refining tower. By means of suitable valves, valves 12 and 13 for example, the ratio between the hydrocarbon vapors and the controlling diluent in the mixture supplied to the refining operation is controlled to correspond to the progressively decreasing activity of the adsorptive catalyst. This controlling diluent, for example, may be steam or some saturated hydrocarbon gas or gas mixture supplied through connection 14. Or, a part of the uncondensed vapors and gases escaping from the receiver 6 may be returned for use as a controlling diluent through connection 15 by means of blower 16. Likewise, a light hydrocarbon fraction, for example, in refining gasoline vapors a gasoline fraction to be blended with the refined product, may be supplied through connection 14 and vaporized by heat exchange with the vapors supplied through connection 1 as it is mixed therewith before entering the tower 3. In refining gasoline vapors, for example, the volumetric ratio between the controlling diluent and the gasoline vapors may be as much as 1:1 or more while the charge of the adsorptive catalyst is fresh and highly active and by the time the charge of the adsorptive catalyst is to be replaced this ratio may be decreased to as little as 1:10 or less, or addition of the controlling diluent may be discontinued entirely by this time.

In one aspect, the invention provides an improved method for controlling refining operations of this general type, in which portions of the charge of the adsorptive catalyst are discharged and replaced during the operation without interrupting the flow of the hydrocarbon vapors to be refined therethrough, either during the initial period of such operation or during the continued operation. The invention also provides an improved method for controlling variations in the refining operation other than the usually encountered progressively decreasing activity of the adsorptive catalyst described above. Any temporary increase in the activity of the adsorptive catalyst, for example, can be accommodated in accordance with the present invention by decreasing the ratio between the hydrocarbon vapors and the controlling diluent to a corresponding extent for the period of such increase in activity.

I claim:

1. In a vapor phase refining of hydrocarbons by passage of the hydrocarbon vapors through a charge of an adsorptive catalyst, the improvement which comprises passing the hydrocarbon vapors through the adsorptive catalyst in admixture with a relatively inactive gaseous diluent and controlling the ratio between the hydrocarbon vapors and the diluent to decrease or increase the proportion of hydrocarbon vapors present in the mixture, respectively, as the activity of the adsorptive catalyst increases or decreases.

2. In the vapor phase refining of hydrocarbons by passage of the hydrocarbon vapors through a charge of an adsorptive catalyst the activity of which decreases as the operation proceeds, the improvement which comprises passing the hydrocarbon vapors through the adsorptive catalyst in admixture with a relatively inactive gaseous diluent and decreasing the proportion of the diluent in this mixture as the operation proceeds.

In testimony whereof, I have subscribed my name.

FRANK A. APGAR.